United States Patent [19]

Clark et al.

[11] Patent Number: 4,801,399

[45] Date of Patent: Jan. 31, 1989

[54] INORGANIC SALTS AS PEPTIZING AGENTS IN THE PREPARATION OF METAL OXIDE SOL-GEL COMPOSITIONS

[75] Inventors: David E. Clark; William J. Dalzell, Jr.; Brenda L. Adams, all of Gainesville, Fla.

[73] Assignee: University of Florida, Gainesville, Fla.

[21] Appl. No.: 841,087

[22] Filed: Feb. 25, 1986

[51] Int. Cl.[4] .............................................. B01J 13/00

[52] U.S. Cl. ............................ 252/315.01; 252/313.1; 252/313.2; 252/315.6; 252/315.7; 501/12

[58] Field of Search ............... 252/313.1, 315.7, 313.1, 252/315.7, 315.1; 423/630; 501/12

[56] References Cited

U.S. PATENT DOCUMENTS 2,085,129 6/1937 Stoewener ....................... 252/315.7

2,487,065 11/1949 Milliken, Jr. ............... 252/315.01 X 2,656,321 10/1953 Hunter et al. .................... 252/313.1

4,429,051 1/1984 Davidge et al. ...................... 501/12

OTHER PUBLICATIONS

Weiser: "A Textbook of Colloid Chemistry", Second Edition, John Wiley & Sons, Inc., New York, 1949, pp. 155 and 156. [QD 549 W4t 1949 C-3].

*Primary Examiner*—Richard D. Lovering

*Attorney, Agent, or Firm*—Fleit, Jacobson, Cohn & Price

[57] ABSTRACT

A novel method for preparing sols from metal oxide precursors by using inorganic salts as the peptizing agent is disclosed herein. Sol-gels prepared from the sols are also disclosed. Ceramic coatings, monoliths, bodies and are formed. These structures have a particle size of down to 0.0001 micron and are endowed with excellent packing characteristics as well as smoothness.

9 Claims, No Drawings

INORGANIC SALTS AS PEPTIZING AGENTS IN THE PREPARATION OF METAL OXIDE SOL-GEL COMPOSITIONS

This invention was made with Government support under F49620-83-C-0072 awarded by the Air Force. The Government has certain rights in this invention.

BACKGROUND OF THE INVENTION

1. Field of the Invention

This invention relates generally to the subject matter of ceramic monoliths, bodies and coating. More particularly, it relates to the peptization of sols of ceramic forming materials, such as aluminum, hafnium, silicon, zirconium, titanium, lanthanum, germanium and tantalum alkoxides, among others, by means of inorganic salts, e.g., nitrates of Al, Zr, Ti, Hf, La, Cr, Ta, Si, Mg, Yt, Co, Ni, Fe, Ge, Rh, Rb and Ba and metal sulfates, sulfides and chlorides of the same elements. This invention also relates to the formation of ceramic material from metal oxides such as, lanthania, thoria, silica, zirconia, alumina, hafnia, titania, chromia, germania, urania, magnesia and tantalum oxide.

2. Description of the Background

It is well known in materials science that predetermined bulk and surface properties may be advantageous for a particular article. These properties may be of a varied nature, including increased toughness as well as high temperature and wear and corrosion resistance. In order to attain this goal, the entire structure of the article may be built utilizing a material which has the desired bulk and surface properties or an article body of desirable properties may be coated with a film having the desired surface properties.

Sol-gel technology involves the preparation of ceramics and glasses by low temperature hydrolysis and peptization of metal oxide precursors (usually organometallic compounds) in solution instead of sintering at high temperatures. By 1975, alumina was synthesized by sol-gel techniques with aluminum sec-butoxide as its organometallic precursor (Yoldas, B.E.(I),"Alumina Sol Preparation from Alkoxides", Amer. Ceram. Soc. Bull. 54(3):289–290(1975); Yoldas, B.E.(II),"A Transparent Porous Alumina", Amer. Ceram. Soc. Bull. 54(3):286–288(1975); Yoldas, B.E.(III),"Alumina Gels That Form Porous Transparent $Al_2O_3$", J. Mater. Sci. 10:1856–1860(1975). According to Yoldas(I), supra, the process of making alumina involves four basic steps:

(1) hydrolysis of aluminum alkoxides,
(2) peptization of the hydroxide to a sol,
(3) gel formation, and
(4) pyrolysis of the dried gel to alumina.

In the Yoldas(I) process, the hydrolysis of the aluminum alkoxide precursor is conducted with an excess of water in a ratio of 100 moles of water per mole of $Al(OC_4H_9)_3$, and the peptization is conducted at 90° C. with 0.07 moles of acid per mole of precursor. The peptized sol is then gelled and dried, and the resulting dried samples are calcined at 1200° C., the temperature of formation of alpha alumina. According to Yoldas(II), supra, alpha alumina is the only stable phase above 1150° C.

Sol-gel technology is a chemical synthesis method which results in a particle size limit reduced by at least an order of magnitude to approximately 0.001 micron or less.

Furthermore, sol-gel processing may be conducted with a wide range of ceramic forming materials to form monoliths, bodies and coatings, that are otherwise difficult to achieve by other methods.

In a co-filed co-pending application entitled "Electrodeposition of Ceramic Coatings Using Sol-Gel Processing and Compositions Thereof", U.S. application Ser. No. 841,089, filed Feb. 25, 1986, the present inventors described a novel method of depositing a ceramic coating on a substrate comprising the electrophoretic deposition from organic and inorganic acid-peptized sols.

In yet another co-filed co-pending Application entitled "Deposition of Ceramic Coatings Using Sol-Gel Processing With Application of a Thermal Gradient", U.S. application Ser. No. 841,088, filed Feb. 25, 1986, and now abandoned, the present inventors described a novel method of depositing a ceramic coating on a substrate comprising the thermal deposition from acid-peptized sols.

Metal oxide (really metal hydroxide) sols are presently made by peptization and hydrolysis of the corresponding metal alkoxide, such as, aluminum sec-butoxide (ASB) (in the case of $Al_2O_3$) in water with a traditional acid, such as hydrochloric acid, acetic acid, nitric acid and the like. Traditional acids simultaneously break up the precursor, thereby allowing for hydrolysis to occur, and form a repulsive electric double layer around the formed colloids. This mechanism accounts for the fact that colloids (the colloidal particles) are finely dispersed in the sol. However, this same repulsive force inhibits the formation of a dense gel, thus leading to stresses arising when the necessary high drying temperatures are applied thereto. These stresses often cause cracking and fracture during the drying of gel bodies.

Therefore, there still remains a need for an improved method of peptizing sols which leads to more successful making of ceramic monoliths, bodies and coatings for depositing onto a substrate. And also a need for sols having particle sizes in the submicron range which afford better opportunities for making monoliths, bodies and coatings having increased toughness and superior resistance to temperature, wear, corrosion and to cracking and fracture of the monolith, body or coating.

SUMMARY OF THE INVENTION

This invention provides a novel method for preparing sols comprising:

(a) hydrolyzing and peptizing a metal oxide precursor where the metal is selected from the group consisting of aluminum, silicon, thorium, hafnium, lanthanum, titanium, germanium, zirconium, tantalum and mixtures thereof, in the presence of an aqueous medium comprising water or a mixture thereof with an organic solvent having a dielectric constant from about 1 to about 35 in the presence of an inorganic salt, capable of disassociating into a cation having a charge greater than about +1 and up to and including about +7, and an anion having an ionic charge greater than or equal to that of $Cl^-$ and up to about 5; said metal oxide precursor, said medium and said inorganic salt being present in a proportion, and said hydrolysis and said peptization being conducted at a temperature and for a time effective to obtain a sol, the colloidal particles of which have a particle size of down to and including 0.001 micron or less.

When a gel is desired, the volume of the aqueous medium of said sol is reduced and the sol cast to initiate gellation. The resulting gel can then be aged, dried and fired to give a monolith or body. If the sol is to be used as coating material, coatings can be deposited on substrates as taught by the referenced copending applications.

This invention also provides a further improvement of a ceramic composition consisting of adding to the sol a filler in the form of a powder, whiskers, fibers, shavings, platelets, collids, fines, ultrafines, among others; said filler serving the function of strengthening and toughening the final article. Any such material known in the art may be utilized in the present compositions and methods. Suitable for use with the present invention are materials such as metal carbides, carbon, silicon nitride, metal nitrides, metal oxides, metal powders, and mixtures thereof which afford increased toughness and resistance to wear, chipping and cracking.

A more complete appreciation of the invention, and many of the attendant advantages thereof, will be readily perceived as the said invention becomes better understood by reference to the following detailed description of the invention. Other objects, advantages and features of the present invention will also become apparent to those skilled in the art from the following discussion.

DETAILED DESCRIPTION OF PREFERRED EMBODIMENTS OF THE INVENTION

An interest in further advancing the art of ceramics to provide both insulating, wear and anticorrosive protection to articles, prompted the present inventors to search for an improved novel and commercially useful method of peptizing metal oxide precursors for use in making ceramics.

(1) The present invention arose from the initial observation that the utilization of certain peptizing agents in the formation of sols would simplify the sol-gel processing by shortening the time required for peptization from that required when using organic and inorganic acids for this purpose;

(2) the realization that more compact and continuous ceramics could be attained due to the reduced size of the sol particles; and (3) the unexpected finding that by using the present family of inorganic salts in the hydrolysis and peptization steps, denser gels are obtained which once dried would have decreased stresses, thereby substantially reducing the degree of cracking and fracture during high temperature drying and thereafter.

Articles of innumerable forms and sizes can be cast or coated by the present process. The processes and compositions of this invention are particularly applicable to the casting of solid bodies of any shape or length and the coating of sheets, strips, wires, rods, and solid bodies of any shape.

Metal oxide sols have been made in the prior art by peptization and hydrolysis of aluminum sec-butoxide (ASB) in water with a traditional inorganic or organic acid. These acids include nitric acid, acetic acid, hydrochloric acid, aqua regia, among others. Traditional acids simultaneously break up the precursor in the alumina sol, thereby allowing hydrolysis to occur and at the same time form a repulsive electric double layer about the colloids. As a consequence thereof, the colloids are finely dispersed in the sol. However, this same repulsive force inhibits the formation of a denser gel and creates stresses at high temperatures. These same stresses can often result in cracking and fractures in the drying gel bodies.

According to the present invention, peptization is carried out using, preferably nitrates of Al, Zr, La, Cr, Mg, Hf, Si, Ge, Ba, Ta, Fe, Ni, Co, Yt, Rh, Rb and Ti. In addition, sulfates, sulfides and chlorides of these elements may be used. Any metal oxide precursor may be used. The inorganic salts of this invention are capable of disassociating into a cation having a charge greater than +1 and up to and including +7. The anion dissociated from the inorganic salt of the invention, e.g., nitrate ions from the aluminum nitrate, inhibits the formation of a repulsive double layer during drying. As a consequence thereof, the drying stresses are substantially reduced and fewer flaws and denser overall bodies can be formed.

The following are some of the advantages afforded by peptizing a sol in accordance with process of this invention.

(1) A metal oxide sol can be produced at a faster rate with an inorganic salt, e.g., aluminum nitrate, than with traditional acids for the same molar ratio of peptizing agent to ASB. For example, a useful sol can be produced in 5 hours with aluminum nitrate (molar ratio 0.06:1) as compared to about 48 hours with nitric acid in a molar ratio of 0.1:1 (moles of peptizing agent to moles of ASB).

(2) The metal oxide sols produced by the invention (inorganic salts) are more translucent than metal oxide sols produced by peptization with traditional acids. This indicates that the colloidal size is smaller in the inorganic salt-peptized metal oxide sols.

(3) The resultant metal oxide monoliths, bodies and coatings produced from inorganic salt-peptized sols are smaller and are therefore more dense than bodies made with traditional acid-peptized sols.

(4) Metal oxide bodies produced with a inorganic salt as a peptizing agent have fewer cracks and a higher overall yield of complete castings than sol-gel bodies produced with traditional, acid-peptizing metal oxide sols.

(5) For a pure system the metal nitrate can match the metal oxide precursor (such as $Al(NO_3)_3$ and $Al_2O_3$) to form a pure sol. This has the added benefit of actually increasing the % of metal oxide in the sol, making the sol more efficient to use.

Charge Development

Colloids in solution develop a surface charge with respect to the suspension medium. This charge can arise by a number of mechanisms such as ion dissolution or adsorption, lattice imperfection (if crystalline) and ionization. Oxides including alumina develop their surface charge by ionization.

The ionization of alumina involves the reaction of protons ($H^+$) and hydroxyl groups ($OH^-$) with a hydrated alumina surface. The chemical equilibria are depicted in equation (I).

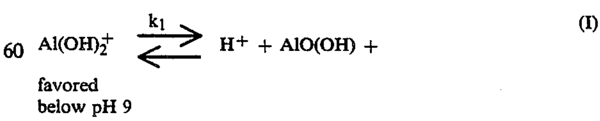

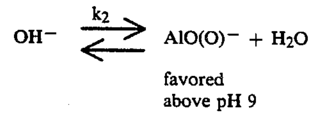

Aluminum hydroxide can react with protons to develop a positive charge. However, aluminum hydroxide may also develop a negative charge by reacting with hydroxyl groups. The protonation reaction is energetically favored below a pH of about 9.1 for aluminum hydroxide. Accordingly, in the sols used herein the colloids are positively charged since the preferred pH is between about 0.1 and 7, more preferably between about 1 and about 5, and still more preferably about 4.0 or lower.

Scheme I:
$Al_2O_3$ Sol Formation Reactions
in the Presence of a an Inorganic Salt

HYDROLYSIS

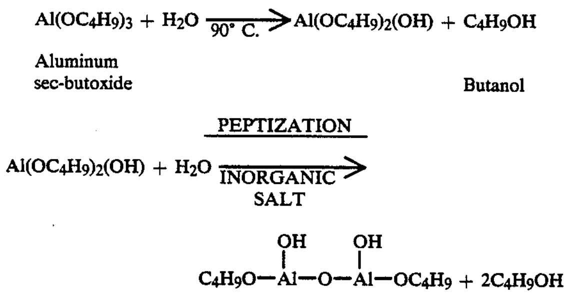

According to this scheme the resulting sol is composed, in the exemplified case, of colloidal particles approximately 100 Å down to 10 Å in diameter which are suspended in a water or water-alcohol medium corresponding to the alkoxide utilized.

A preferred embodiment of the present process encompasses the utilization of an aqueous medium comprising water or a water-solvent mixture for the hydrolysis and peptization step. Preferred solvents are solvents having a dielectric constant less than and including about 35. More preferred are solvents having a dielectric constant of between about 1 and about 35. Still more preferred organic solvents for use in the present process are those having, in addition, low viscosity, low evaporation rate, low electrical conductivity, and low cost. A specific group of preferred organic solvents are organic alcohols, aldehydes, and ketones. Further examples of organic solvents meeting these requirements suitable for use in the present process are methyl alcohol, ethyl alcohol, denatured ethyl alcohol, isopropanol, butanol and acetone.

Any metal alkoxides or metal organic compounds which serves as a precursor for a metal oxide may be utilized substantially by themselves or in mixtures in an amount from about 1% to about 100%.

When the formation of the sol is attained, the suspension has a range of particle sizes between about 0.0001 micron and about 1 micron, preferably of between about 0.001 micron and about 0.005 micron, and more preferably between about 0.001 micron and about 0.003 micron. Within these ranges of particle sizes, a more intimate contact of the materials is attained which permits the formation of a more continuous structure. This enables the structures of the present invention to have excellent adhesion and a smooth appearance as well as a tight sealing capability resulting in superior anti-corrosive, wear resistance and insulating properties.

The metallic hydroxide sols may be prepared by hydrolysis and peptization of the corresponding metal alkoxides in an aqueous medium. Preferred alkoxides are metal tertiary alkoxides, metal butoxides, metal methoxides, metal hydroxides and the like. Still more preferred among the metal tertiary alkoxides are metal sec-butoxide, metal n-propoxides, and organosilanes.

In accordance with this invention, the peptization of metal oxide sols is undertaken with the aid of an inorganic salt instead of the inorganic or organic acids used in prior processes. The inorganic salt in solution acts as a Brönsted acid which is capable of non-covalently bonding with a Brönsted base by means of a partial donation of a pair of electrons from said base to said acid.

The inorganic salts group will be exemplified herein by means of $Al(NO_3)_3$, although other salts, as previously given, may be used as well. Particularly suited for the practice of this invention are inorganic salts, preferably nitrates, of cations having a charge of greater than +1. Of interest for this invention are cations having a charge of between greater than about +1 and up to and including about +7. Other groups of interest within the above group are those formed by cations having a charge of between greater than and including about +2 and up to and including about +3, and between greater than and including +4 and up to and including about +7. A further group is that of cations having a charge of between greater than and including about +2 and up to and including about +4. Specific examples of such ions are $Al^{+3}$, $Cr^{+3}$, $La^{+3}$, $Zr^{+3}$, $Mg^{+2}$, $Hf^{+3}$, $Si^{+4}$, $Ge^{+4}$, $Ba^{+2}$, $Ta^{+4,\,+5}$, $Fe^{+2,\,+3}$, $Ni^{+3,\,+4,\,+5}$, $Co^{+3,\,+4,\,+6}$, $Yt^{+3}$, $Rh^{+3,\,+4,\,+6}$, $Rb^{+1}$, as well as magnesium and titanium.

Specific examples of suitable anions are $NO_3^-$, $SO_3^-$ and $Cl^-$. Examples of the inorganic salts useful in this invention are nitrates (preferred) of the elements previously listed as well as sulfates, sulfides and chlorides of them.

The following will be described with reference to $Al(NO_3)_3$ as a preferred example, but a similar reasoning can be applied to other inorganic salts as well within the context of the present invention.

When an inorganic salt having a high positively charged cation dissociates, it does so by freeing an anion and a high positively charged cation. These ions interact with the colloidal surface charge. The cation acts as a charge-determining ion and may be chemically bonded with the colloids, thereby increasing the surface charge by greater than +1. With a traditional acid, such as HCl, $HNO_3$, acetic acid, tricloroacetic acid and aqua regia, the $H^+$ ion can also be chemically bonded to the colloids, but it only increases the surface charge by +1 whereas a cation with a higher charge, e.g., +3 in the case of $Al^{+3}$ increases the surface charge more. This charge difference is significant since the double layer of positively charged ions surrounding the colloid can thus be more extensive, and possibly be formed faster. The double ionic layer thus formed can be more extensive because the counter ions ($HO^+$) and the anion freed from the inorganic salt (e.g., $NO_3^-$), both are quite large and cannot be packed as closely together as would the $Cl^-$ ion. Accordingly, the double layers have a larger radius and the repulsion therebetween (between the large charged colloidal particles) causes peptization to occur, thereby stabilizing the sol. Effective therefor are cations having a charge higher than +1.

This stronger double layer repulsion allows the volume of liquid in the sols to be reduced much further before gelation occurs, thereby reducing post gelation shrinkage and cracking due to stresses. This, in turn, facilitates the formation of more uniform solid bodies, monolithic pieces and coatings.

The time required for obtaining a sol can be determined by simple observation. A finished sol becomes translucent, this being an indication of the attainment of the specific colloidal formation and distribution required. Accordingly, the time required for obtaining a sol according to this invention, depends on the molar ratio of the inorganic salt to the organometallic compound or constituent used for the hydrolyzation and peptization thereof. Preferred molar ratios of inorganic salt to organometallic constituents are from between about 1:1 to about 0.001:1, more preferred are molar ratios of between about 0.01:1 and about 0.1:1. The corresponding approximate times needed for the production of the sol are preferably between about 1000 hours and about ½ hour, more preferably between 500 hours and about 1 hour, and still more preferably between about 24 hours and about 1 hour. However, other molar ratios and reaction times can also be utilized, including higher molar ratios of inorganic salt to organometallic constituent than the above mentioned. Particularly suitable when using aluminum nitrate and aluminum alkoxides are molar ratios of aluminum nitrate to aluminum sec-butoxide of between about 0.005:1 and about 1:1, and preferably between about 0.01:1 and 0.1:1.

After the sol has become clear it can be stored in a container (e.g., made of glass or other inert material) until needed.

A preferred embodiment of the present process encompasses the utilization of an aqueous medium comprising water or a water-solvent medium for the hydrolysis and peptization step.

The amount of water in the aqueous medium may be broadly varied in accordance with the rest of the parameters. Preferred amounts of water are between about 10 wt. % and about 99 wt. % of the composition. A still more preferred amount is between about 30 wt. % and about 60 wt. %, preferably between about 30 wt. % and about 50 wt. %. Where water-solvent mixtures are utilized, the water:solvent proportion must be between about and including 10,000:1 and about and including 2:1.

The proportion of organometallic compound to aqueous medium can be between about 1:2 and about 1:10,000, preferably between about 1:2 and about 1:1,000. The best results are obtained with a ratio of a organometallic compound:aqueous medium of between about 1:2 and about 1:100.

A sol-gel (a sol ready for gelling) can then be formed by reducing the volume of aqueous solution of the sol. The volume reduction may be accomplished by a variety of methods, including evaporation, boiling, freeze drying, selective permeation of the liquid phase, among others. These processes can be carried out within a broad range of temperatures. Preferred temperatures are between about −60° C. and about 200° C., more preferred are temperatures of between about 15° C. and about 100° C., and still more preferred are temperatures of between about 80° C. and about 100° C.

Fillers can be used in the present invention for toughening and strengthening the monoliths, bodies and coatings and reducing mechanical damage thereto, thereby minimizing the amount of wear, chipping or cracking. Preferred filler forms are colloids, particles, fines, ultrafines, whiskers, platelets and fibers, among others. Preferred filler materials are carbides like silicon carbide, metallic oxides, metal nitrides, silicon nitride, carbon, and metal powders. However, other toughening and strengthening materials known and used by the prior art may also be utilized. These fillers may be added prior to or during the formation of the sol, as well as prior to and while reducing the volume of liquid to prepare the sol for casting. The fillers may be added prior to or during a deposition step, if the sol is used for coating.

The sol is at least stable for about 7 months at a temperature of 20° C., and perhaps years at a temperature of between about 5° C. and about 20° C. At room temperature its stability has been preserved for up to 7 months. If refrigerated, the solution may be kept for a longer time.

Dewatering the sol is obtained by reducing the volume of water content to between about 10 volume % and 90 volume % preferably to between about 50 volume % and about 80 volume %. A suitable partially dewatered product may be obtained by reducing the volume of liquid to between about 20 volume % and about 50 volume %. It is envisioned that the corresponding dewatered sols may be reconstituted at a later time by adding an aqueous medium containing between about 30 volume % and about 70 volume % or a mixture thereof with an organic solvent having the characteristics described supra.

A monolith according to the present invention may be cast in the following manner. A metal oxide sol is peptized according to this invention and thereafter the water content is reduced, e.g., by evaporation, boiling, and the like to a volume of between about 1/10 and about ½ of the starting sol volume, preferably to between about 1/5 and about ½, and more preferably to between about ¼ and about ⅓ of the starting sol volume. The thus reduced volume of solution is then cast into a mold optionally coated with a thin layer of a known releasing agent.

Monolith gels can be produced in a range of temperatures from between about 5° C. and about 65° C., more preferably between about 10° C. and about 50° C., and still more preferably between about 15° C. and about 25° C.

The degree of humidity to which the above preparation may be subjected during the formation of a monolith gel is preferably between about 1% and about 99%, more preferably between about 10% to about 95%, and still more preferably between about 40% and 90%.

In still another embodiment of this invention, composites can be formed by adding a filler to the sol prior to casting or deposition. The filler is in suspension during casting or deposition and serves to strengthen and toughen the resulting article. Examples of such fillers have been previously listed as well as their forms.

Further, hollow articles may also be prepared as cast monoliths. The thickness of such articles is envisioned to be between about 1 mm and about 10 cm.

Monoliths of varying sizes and shapes, may be prepared according to this invention. Examples of the shapes are cylindrical, conical, cubic, trapezoidal, semi spherical lens, and any forms having a geometrically defined or undefined shape. Examples of possible sizes are provided with respect to the length of a hypothetical cube, but similarly sized articles of other shapes may also be prepared. A radius of between about 1 cm and about 10 m is envisioned.

The obtained gels are process conventionally, that is, aged and then dried at elevated temperatures to achieve a final product.

The invention being generally described, a more complete understanding can be attained by reference to the examples which are provided herein for purposes of illustration only, and are not intended to be limiting unless otherwise specified.

EXAMPLES

Example 1

Alumina sol was produced by hydrolyzing 123 ml aluminum sec-butoxide (ASB) with 876.1 ml triple-deionized water and 12.78 gr aluminum nitrate in a condenser-equipped reaction vessel at 80° C. with constant stirring. The solution had a pH of 3.15 and was allowed to stand at a temperature 85° C. for a time sufficient to become translucent (about two hours), which indicates that a sol has been obtained. Several different sols were prepared using molar ratios of aluminum nitrate to ASB from 0.01:1 to 0.1:1, and using different inorganic salts, magnesium nitrate, zirconyl nitrate, lanthanum nitrate and chromium nitrate. The molar ratio of ASB to water was 1:100.

Example 2

850 ml deionized water were heated in a beaker up to 80° C. (range 50° C.-120° C.) in a stirring flask (magnetically operated) with an evaporator/condenser attachment. While still stiring, 124 ml aluminum sec-butoxide precursor (other precursors—silica, zirconia, etc. will also do) were slowly added to the solution. Next, 12.78 grams aluminum nitrate ($Al(NO_3)_3.9H_2O$) were added and the beaker let stir and heat above 80° C. Within 24 hours a clear peptized usable sol was ready for use.

Example 3

Casting A Monolith

Alumina sol-gel monoliths were formed by taking 1000 ml of alumina sol peptized in the presence of aluminum nitrate and ASB according to the method of this invention, see Example 1, and then reducing the water content by boiling to 250 ml under constant stirring. The solution was then cast into four 50 ml Petri dishes each coated with two drops of organosilane ester R-272 and a 50 ml TEFLON beaker. The solution was weighed before and after casting and the four Petri dishes were placed in a Blue M constant temperature/-humidity cabinet at 87% humidity and 40° C. temperature for 24 hours. The final dried monoliths were observed and then fired to 1500° C. in an air atmosphere and observed again after firing. Good results were obtained.

For a pure system it is preferred to use the same metal nitrate, e.g. aluminum nitrate, to peptize the same metal oxide, e.g. aluminum sec-butoxide, to form a pure metal hydroxide sol, e.g. alumina sol. This has the added benefit of actually increasing the % of metal (alumina) in the solution, thus, making the solution more efficient to use.

For a composite system, for example, alumina with zirconia filler, an alumina precursor could be peptized with zirconyl nitrate to produce a composite sol.

Nitrates are the preferred inorganic salts. Even though salts of chlorides, sulfates and sulfides will work, they are less preferred in the production of sols.

For the example of alumina sol peptized by aluminum nitrate, the preferred molar ratios (moles precursor to moles inorganic salt) are from 1:0.1 to 1:0.01. The broader range is 1:1 to 1:0.001.

The advantage of using less inorganic salt is that there is less repulsion between particles in the sol and hence, a better chance to form denser monoliths. The advantage of using more inorganic salt is that there is a more efficient sol with greater concentration of metal ions in solution.

The amount of filler which may be added to the medium is between about 1 wt. % to about 90 wt. % of the sol, preferably between about 10 wt. % and about 70 wt. %, and most preferably between about 20 wt. % and about 40 wt. %.

Having now fully described the invention, it will be apparent to one of ordinary skill in the art that many changes and modifications can be made thereto without departing from the spirit or scope of the invention as set forth herein.

What is claimed is:

1. A method of preparing a metal oxide sol, said method comprising the steps of:

hydrolyzing and peptizing a metal alkoxide in the presence of an excess of aqueous medium and in the presence of a metal nitrate used as a peptizing agent, said metal alkoxide, said medium and said nitrate being present in a proportion, and said hydrolysis and said peptizing being conducted at a temperature and for a time effective to obtain a sol whose colloids have a particle size of up to and including 10 microns.

2. The method of claim 1 wherein said alkoxide is aluminum sec-butoxide.

3. The method of claim 1 wherein the metal nitrate is aluminum nitrate.

4. The method of claim 1 wherein the proportion of metal nitrate to metal alkoxide for the formation of the sol is between 0.001:1 and about 1:1.

5. The method of claim 1 wherein the particle size in the sol is between about 0.0001 micron and about 1 micron.

6. The method of claim 1 wherein the peptizing temperature is between about 80° C. and about 120° C.

7. A method for obtaining a metal oxide sol-gel, comprising:

(a) the method of claim 1 to obtain a sol; and (b) partially reducing the volume of said aqueous medium of said sol to obtain a sol-gel.

8. The method of claim 7 wherein the sol-gel further contains a filler in the form of a powder, shavings, fibers, fines, ultrafines, whiskers, colloids or platelets and mixtures thereof.

9. The method of claim 8, wherein the filler comprises a material selected from the group consisting of carbon, metal powders, carbides and nitrides and mixtures thereof.

* * * * *